United States Patent
Hocker

(10) Patent No.: US 11,232,209 B2
(45) Date of Patent: Jan. 25, 2022

(54) TROJAN DETECTION IN CRYPTOGRAPHIC HARDWARE ADAPTERS

(71) Applicant: International Business Machines Corporation, Armonk, NY (US)

(72) Inventor: Michael D. Hocker, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 16/251,657

(22) Filed: Jan. 18, 2019

(65) Prior Publication Data

US 2020/0233964 A1   Jul. 23, 2020

(51) Int. Cl.
| | | |
|---|---|---|
| G06F 21/57 | (2013.01) | |
| G06F 21/51 | (2013.01) | |
| H04L 9/32 | (2006.01) | |
| G06F 12/14 | (2006.01) | |
| G06F 21/30 | (2013.01) | |
| G06F 21/72 | (2013.01) | |

(52) U.S. Cl.
CPC ............ *G06F 21/572* (2013.01); *G06F 12/14* (2013.01); *G06F 21/30* (2013.01); *G06F 21/51* (2013.01); *G06F 21/72* (2013.01); *H04L 9/3236* (2013.01); *H04L 2209/12* (2013.01)

(58) Field of Classification Search
CPC .......... G06F 21/30; G06F 21/44; G06F 21/51; G06F 21/57; G06F 21/572; G06F 21/72; G06F 21/75; G06F 21/86; G06F 21/87; G06F 12/14; G06F 12/1425; H04L 9/0643; H04L 9/0897; H04L 9/3236; H04L 9/3247; H04L 9/127
See application file for complete search history.

(56) References Cited

U.S. PATENT DOCUMENTS

| | | | | |
|---|---|---|---|---|
| 8,601,170 | B1 * | 12/2013 | Marr | G06F 8/65 710/8 |
| 9,183,606 | B1 * | 11/2015 | Paczkowski | G06F 21/57 |
| 9,553,858 | B2 | 1/2017 | Anand et al. | |
| 9,965,632 | B2 * | 5/2018 | Zarakas | G06F 8/654 |
| 2006/0107032 | A1 * | 5/2006 | Paaske | G06F 21/57 713/2 |
| 2007/0168048 | A1 * | 7/2007 | Allen | G06F 21/71 700/2 |

(Continued)

OTHER PUBLICATIONS

Anonymous, "Trusted Platform Module," Wikipedia, URL <https://en.wikipedia.org/wiki/Trusted_Platform_Module#Overview> (retrieved Oct. 10, 2017), 10 pages.

(Continued)

*Primary Examiner* — Eric W Shepperd
(74) *Attorney, Agent, or Firm* — Cantor Colburn LLP; Edward Wixted

(57) ABSTRACT

A cryptographic hardware security module (HSM) includes a memory storage device and an immutable hardware unit in signal communication with the memory storage device. The memory storage device is configured to store firmware. The immutable hardware unit is configured to perform a hash operation on targeted firmware stored in the memory storage device to determine an authenticity of the targeted firmware based at least in part on results of the hash operation.

12 Claims, 3 Drawing Sheets

(56) References Cited

U.S. PATENT DOCUMENTS

| | | | |
|---|---|---|---|
| 2008/0141350 A1 | 6/2008 | Merkin et al. | |
| 2009/0125716 A1* | 5/2009 | Wooten | G06F 21/57 713/164 |
| 2009/0172639 A1* | 7/2009 | Natu | G06F 21/57 717/120 |
| 2009/0300366 A1* | 12/2009 | Gueller | G06F 21/51 713/189 |
| 2011/0010543 A1* | 1/2011 | Schmidt | H04L 63/123 713/168 |
| 2011/0131403 A1* | 6/2011 | Ibrahim | G06F 21/572 713/2 |
| 2011/0161663 A1 | 6/2011 | Nakhjiri | |
| 2013/0010962 A1* | 1/2013 | Buer | G06F 21/35 380/270 |
| 2014/0310509 A1* | 10/2014 | Potlapally | G06F 21/57 713/2 |
| 2016/0048678 A1* | 2/2016 | Thom | G06F 21/552 726/22 |
| 2016/0147996 A1* | 5/2016 | Martinez | G06F 21/572 713/2 |
| 2016/0307088 A1* | 10/2016 | Wurmfeld | G06K 19/07381 |
| 2018/0121656 A1* | 5/2018 | Scherer, III | G06F 11/1469 |
| 2018/0225459 A1* | 8/2018 | Zarakas | G06F 21/86 |
| 2018/0330093 A1* | 11/2018 | Shivanna | G06F 9/4401 |
| 2019/0340379 A1* | 11/2019 | Beecham | G06F 16/9014 |

OTHER PUBLICATIONS

Arthur et al., "Platform Security Technologies That Use TPM 2.0", (2015) pp. 331-348.

Kotikela, "Radium: Race-free On-demand Integrity Measurement Architecture", Supported by NCSS Industry/University Cooperative Research Center (IUCRC) 19 pages.

Winkler et al., "Privacy and Security in Video Surveillance," in Intelligent Multimedia Surveillance Current Trends and Research, Atrey et al. eds., (2013) 30 pages.

* cited by examiner

TROJAN DETECTION IN CRYPTOGRAPHIC HARDWARE ADAPTERS

BACKGROUND

The present invention relates to data security systems, and more specifically, to techniques for securing a cryptographic hardware security module.

Computer systems can employ various data security measures to protect data from unauthorized access. One such security measure is to implement a hardware security module (HSM), which operates to withstand both physical and logical attacks by using special hardware to perform cryptographic operations that utilize security keys. Conventional HSMs can perform binary signing, which secures data using a public-private encryption scheme. For example, a binary is signed with a public key, and a client uses the private key to verify the signing of the binary.

SUMMARY

According to a non-limiting embodiment, a cryptographic hardware security module (HSM) comprises a memory storage device and an immutable hardware unit in signal communication with the memory storage device. The memory storage device is configured to store firmware. The immutable hardware unit is configured to perform a hash operation on targeted firmware stored in the memory storage device to determine an authenticity of the targeted firmware based at least in part on results of the hash operation.

According to another non-limiting embodiment, a method is provided to verify firmware stored in a hardware security module (HSM), the method comprising initiating an authentication process, delivering targeted firmware from a storage memory device to an immutable hardware unit. The method further comprises performing, via the immutable hardware unit, a hash operation on the targeted firmware, and determining an authenticity of the targeted firmware based at least in part on results of the hash operation.

According to still another non-limiting embodiment, a computer program product is provided. The computer program product includes a computer readable storage medium having program instructions embodied therewith. The program instructions are executable by a computer processor to cause a cryptographic hardware security module (HSM) to perform operations comprising initiating an authentication process, delivering targeted firmware from a storage memory device to an immutable hardware unit. The method further comprises performing, via the immutable hardware unit, a hash operation on the targeted firmware, and determining an authenticity of the targeted firmware based at least in part on results of the hash operation.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
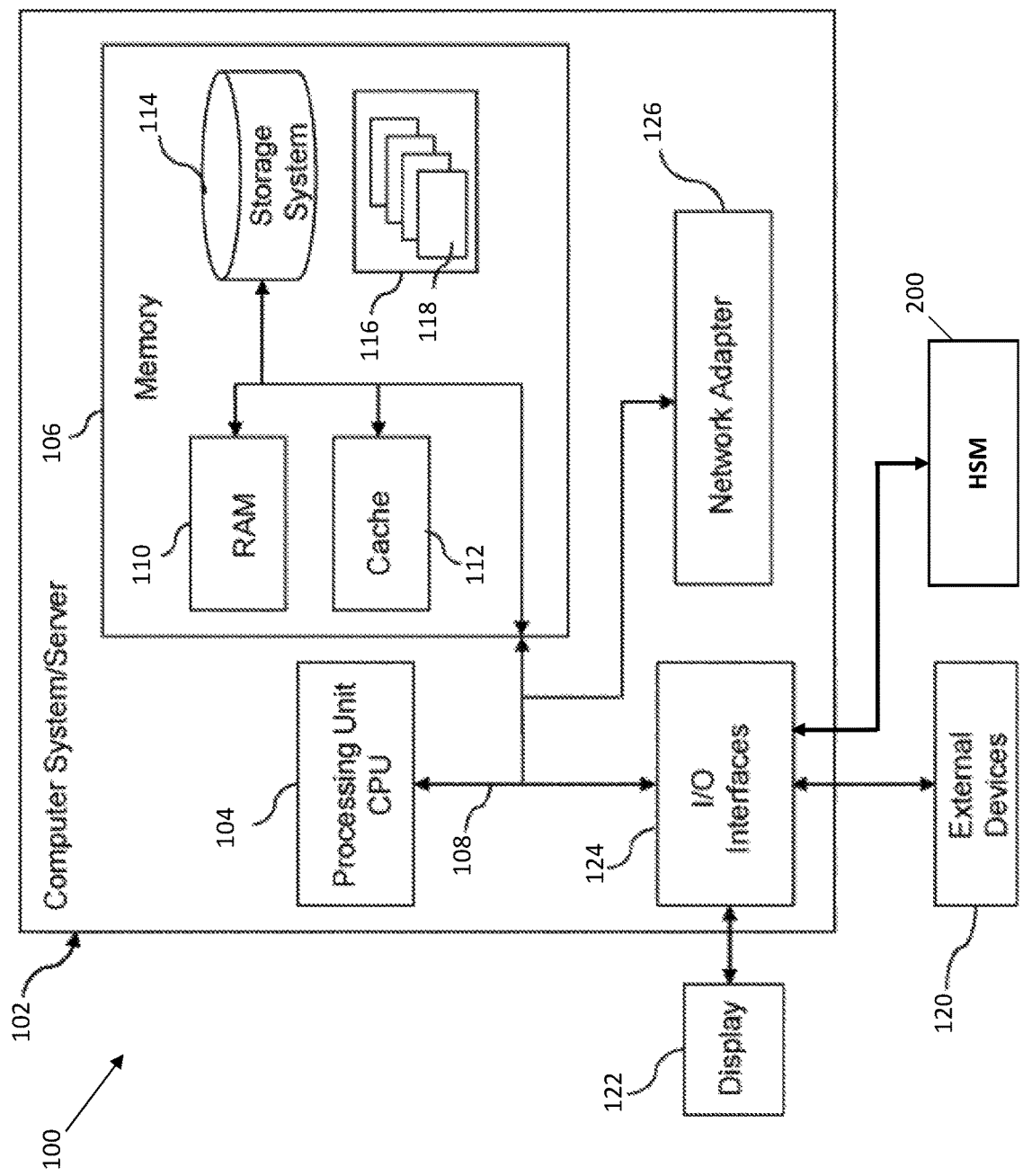
FIG. 1 illustrates a block diagram of a data processing system capable of employing a cryptographic hardware security module (HSM) according to a non-limiting embodiment of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more relevant to cryptographic security, hardware security modules (HSMs) are devices used to store confidential information including, for example, encryption keys (e.g., private keys, master keys, etc.). HSMs may be implemented using tamper-resistant and/or tamper respondent hardware (e.g., methods or means of resisting and/or detecting attempts to physically compromise device secrets). In some embodiments, HSMs may be crypto co-processors which are configured to store confidential information in a manner that prevents access to the confidential information. Moreover, such an HSM may be configured to block usage of the confidential information unless proper authentication is provided. For example, a user may not be able to use the keys stored in an HSM if it cannot prove that it has the right to do so. Further, in some embodiments, an HSM may be a hardware adapter or a partition within a self-virtualizing adapter (e.g., a cryptographic domain in a crypto adapter). Further, in some embodiments, an HSM may be a co-processor that is affixed to a computer's motherboard. In addition, a single co-processor may be partitioned, so as to enable it to maintain two or more separate HSMs at one time.

An HSM may include a storage unit that stores firmware configured to perform various cryptographic functions including, for example, key generation, signing, verification, encryption, and decryption. These operations may be performed in conventional ways. For example, an HSM may employ the Rivest-Shamir-Adleman (RSA) algorithm for encryption/decryption and digital signature operations, and the Secure Hash Algorithm SHA-1 for hash operations. The firmware which executes in the process has the ability to be updated. This update is facilitated using a process which receives a signed object (sometimes referred to as a signed binary) containing the new/revised firmware. The process verifies the signing using secrets contained within the HSM (within the secure boundary, in battery backed SRAM in this case).

The advancement of quantum computing has facilitated the ability of quantum computers to execute Shor's algorithm in a manner that effectively achieves factorization of large numbers. As a result, there is a growing awareness of the vulnerability of present-day RSA and elliptic curve public key cryptography to a possible future quantum computer running Shor's algorithm, in particular compromising cryptographic signing using susceptible algorithms. This growing concern has inspired a search for new cryptosystems that are "Shor-immune."

Nevertheless, should the signing keys associated with an HSM be compromised, an attacker could conceivably modify the firmware and/or install an adverse binary or malicious software program such as for example, a "Trojan". Trojans can appear as a valid binary to external components, when in fact it operates to perform various security breaches such as unauthorized data collection, along with establishing inconspicuous backdoors that provide the remote computing device with unauthorized access to the affected computing system.

To address the aforementioned cryptographic security concerns, various non-limiting embodiments of the present teachings provide a computing system that implements a cryptographic hardware security module (HSM) capable of detecting post-quantum cryptographic (PQC) security threats such as, for example, Trojan attacks. In at least one non-limiting embodiment, the cryptographic HSM includes an immutable hardware unit, which permits hashing of the flash storage device while also being configured to load data only from specified areas of the flash storage device. In at least one non-limiting embodiment, whitelisting hashes and/or analyzing the binary data can diagnose a targeted binary executable to detect whether malicious firmware has been installed in the system.

Accordingly, the cryptographic HSM can be probed externally to diagnose the binary executable that is installed within the secure boundary without the chance that the binary executable has been compromised to falsely report an output that appears to be a valid hash, and without the chance that the hardware has been modified to falsely report a valid hash. In other words, without a secure boundary there are various methods known to pervert the hardware between the immutable hardware boundary and the secure flash, with the intent of reporting a valid hash (typically, the hardware manipulation is by a party that has physical access to the HSM "in transit" or "in situ"). Accordingly, a secure boundary aims to prevent the hardware attack vector.

With reference now to FIG. 1, a block diagram of a data processing system 100 capable of employing a cryptographic hardware security module (not shown in FIG. 1) is illustrated according to a non-limiting embodiment. The data processing system 100 is only one example of a suitable data processing system and is not intended to suggest any limitation as to the scope of use or functionality of embodiments of the invention described herein. Regardless, the data processing system 100 is capable of being implemented and/or performing any of the functionality set forth herein above.

The data processing system 100 includes a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 102 may be described in the general context of computer system executable instructions, such as program modules, being executed by a computer system. Generally, program modules may include routines, programs, objects, components, logic, data structures, and so on that perform particular tasks or implement particular abstract data types. The computer system/server 102 may be practiced in distributed cloud computing environments where tasks are performed by remote processing devices that are linked through a communications network. In a distributed cloud computing environment, program modules may be located in both local and remote computer system storage media including memory storage devices.

The components of the computer system/server 102 may include, but are not limited to, one or more processors or processing units 104, a system memory 106, and a bus 108 that couples various system components including system memory 106 to processor 104.

The bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 102 typically includes a variety of computer system readable media. Such media may be any available media that is accessible by the computer system/server 102. The readable media can include both volatile and non-volatile media, removable and non-removable media.

The system memory 106 can include computer system readable media in the form of volatile memory, such as random access memory (RAM) 110 and/or cache memory 112. The computer system/server 102 can further include other removable/non-removable, volatile/non-volatile computer system storage media. In at least one non-limiting embodiment, a storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. The memory 106 can also include at least one program product having a set (e.g., at least one) of program modules that are configured to carry out the functions of embodiments of the present teachings.

The memory 106 can store a program/utility 116, which includes a set (at least one) of program modules 118. The program modules include, for example, an Operating System (OS), one or more application programs, other program modules, and program data. Each of the OS, one or more application programs, other program modules, and program data or some combination thereof, may include an implementation of a networking environment. The Program modules 118 can generally individually and/or in conjunction with one another facilitate the functions and/or methodologies of various embodiments as described herein.

The computer system/server 102 can also communicate, via an input/output (I/O) interfaces 124, with one or more external devices 120 including, but not limited to, a keyboard, a pointing device, a display 122, and a hardware security module. The computer system/server 102 is also capable of communicating with one or more devices that enable a user to interact with computer system/server 102 and/or any devices (e.g., network card, modem, etc.) that enable computer system/server 102 to communicate with one or more other computing devices. Such communication can occur via the Input/Output (I/O) interfaces 124. Still yet, the computer system/server 102 can communicate with one or more networks such as a local area network (LAN), a general wide area network (WAN), and/or a public network (e.g., the Internet) via network adapter 126. The network adapter 126 communicates with the other components of computer system/server 102 via the bus 108. It should be understood that although not shown, other hardware and/or software components could be used in conjunction with computer system/server 102. Examples, include but are not limited to: microcode, device drivers, redundant processing units, external disk drive arrays, RAID systems, tape drives, and data archival storage systems, etc.

Figure 2:
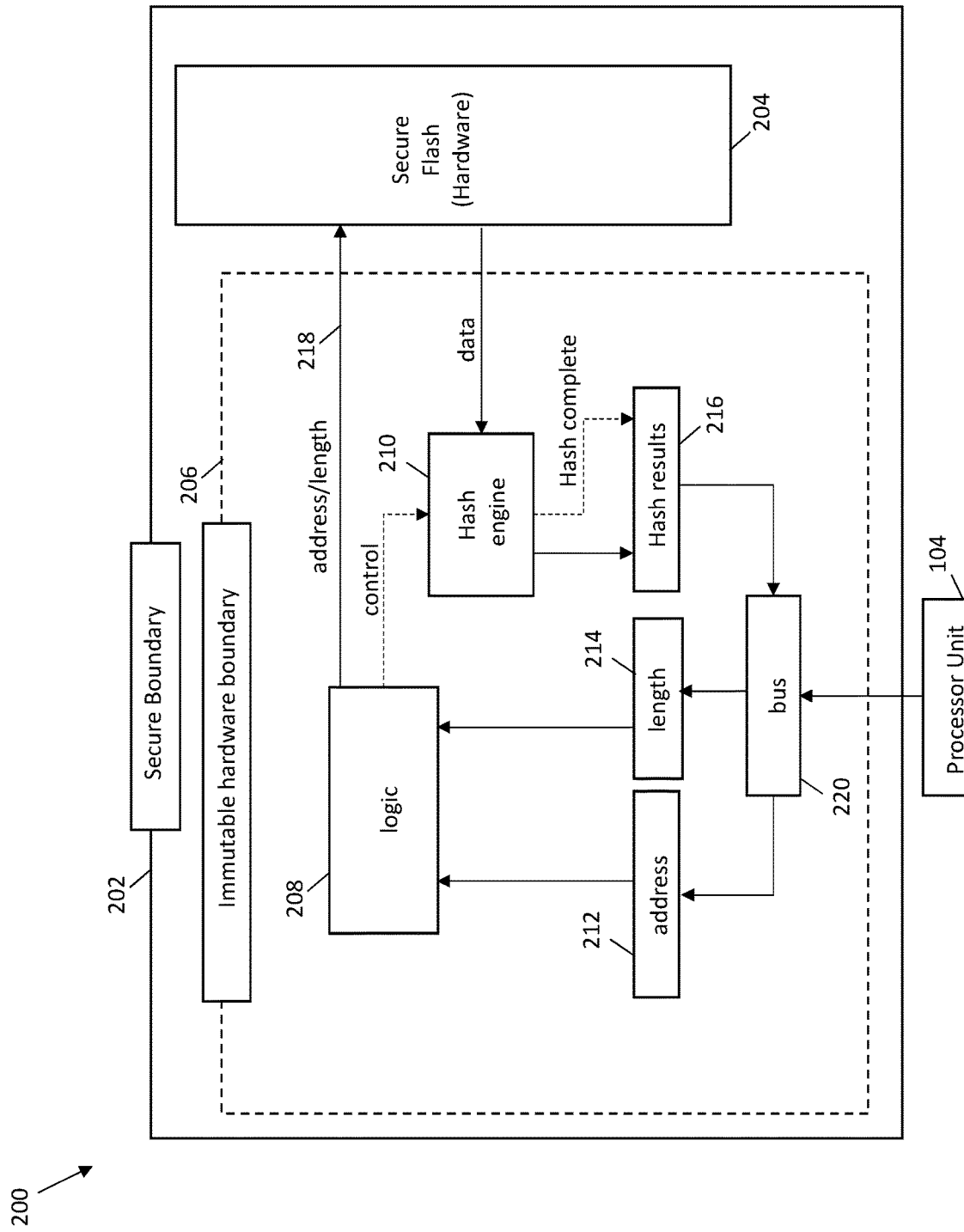
FIG. 2 is a block diagram of a cryptographic HSM capable of detecting post-quantum cryptographic (PQC) security threats according to a non-limiting embodiment of the invention.

Turning now to FIG. 2, a block diagram of a cryptographic HSM 200 capable of detecting post-quantum cryptographic (PQC) security threats is illustrated according to a non-limiting embodiment. In one or more embodiments, the cryptographic HSM 200 can be constructed as an electronic hardware controller that includes memory and one or more processors configured to execute algorithms and computer-readable program instructions stored in the memory. The cryptographic HSM 200 includes a secure boundary 202 that contains a flash storage unit 204 and an immutable hardware unit 206. Although not illustrated, The HSM 200 can also contain additional cryptographic engines and processor(s).

The secure boundary 202 includes, for example, a tamper-responsive and tamper-evident housing comprising various fortified materials capable of detecting and/or responding to various attack methods including but not limited to physical intrusion, x-ray, temperature, and other physical invasive and non-invasive methods.

The flash storage unit 204 includes electrically erasable, persistent-data memory. In one or more embodiments, the flash storage unit 204 stores sensitive data that is selectively encrypted using an encryption key. The encryption keys used for encryption can be stored in battery-backed RAM (not shown) and can be zeroized or erased in response to a detected tampering event, e.g., an attempt to tamper, breach, and/or compromise the secure boundary 202.

The immutable hardware unit 206 is configured to verify the authenticity of the data and executable firmware stored in the flash storage unit 204. The immutable hardware unit 206 includes logic circuitry 208, a hash engine 210, an address register 212, a length register 214, a hash results register 216, and a bus 220. The logic circuitry 208 and hash engine 210 can each be constructed as an individual hardware processor. In other embodiments, the logic circuitry 208, hash engine 210, address register 212, length register 214, and hash results register 216 can be integrated together to form a single hardware controller. In any case, the logic circuitry 208, hash engine 210, address register 212, length register 214, hash results register 216, and bus 220 cannot be changed after manufacturing, e.g., there is no firmware, microcode, variable logic (i.e., an FPGA), or components contained in the immutable hardware unit 206 that may be changed, modified, added or removed, after the immutable hardware unit 206 is manufactured. Accordingly, tampering of the hardware components can be easily discerned.

The address register 212 stores address data indicating the known address within the flash storage unit 204 that contains data including a targeted firmware to be verified. The length register 214 stores length data defining the location within the flash address (i.e. the length of the address range) where the firmware to be verified resides. That is, the address indicated by the address contains the firmware targeted for verification, along with additional data. The location data defines the location of the firmware among all the data stored in the address. In at least one non-limiting embodiment, the address register 212 and the length register 214 are memory mapped via a PCIe specification.

In response to initiating an authentication process, the logic circuitry 208 obtains address data from the address register 212 and length data from the length register 214. The address data and the length data define the targeted firmware to be verified before allowing normal operation of the cryptographic HSM 200. The authentication process can include, for example, booting the cryptographic HSM. That is, upon startup of the cryptographic HSM 200 (prior to booting of the HSM 200), the logic circuitry 208 can request the address data and the length data of the targeted firmware to be authenticated.

In response to determining the address data and length data, the cryptographic HSM 200 generates a firmware request signal 218. The storage unit 204 receives the firmware request signal 218, and in response outputs the firmware (i.e., the software code corresponding to the targeted firmware) to the hash engine 210.

The hash engine 210 receives the firmware and performs a hash operation thereon. In one or more embodiments, the hash operation is performed without using a device that physically breaches or accesses the secure boundary 202. That is, all of the connections are within the secure boundary 202 such that the interaction between the hash engine 210 and the firmware stored in the storage unit 204 is performed entirely within the security boundary 202

The hash engine 210 can employ various hash algorithms including, but not limited to, a message-digest algorithm (e.g., MD5), a Secure Hash Algorithm (e.g., SHA-1, SHA-2, SHA-3), a RACE Integrity Primitives Evaluation Message Digest (e.g., RIPEMD 160), WHIRLPOOL, BLAKE, and BLAKE2. The results of the hash operation (sometimes referred to as hash values, hash codes, digests, or simply hashes) are output from the hash engine 210 and delivered to the hash results register 216.

The hash results from the hash results register 216 can be delivered to an external processor such as, for example, processor 104 via bus 220. Accordingly, the processor compares the hash results to a known hash corresponding to authorized firmware expected to be stored in the flash storage unit 204. When the hash result matches the known hash, the processor 104 determines that the targeted firmware is authorized and has not been compromised. When, however, the hash result does not match the known hash, the processor determines that the firmware has been modified or is not the authorized firmware expected to be stored in the flash storage unit 204.

In at least one non-limiting embodiment, the computer system 100 can perform one or more security operations in response to detecting that the results of the hash operation fail to match the predetermined hash. For example, the computer system 100 can attempt to update the firmware via the established process to install a valid non-compromised firmware image. The computer system 100 can then reattempt to verify installation. When, however, the update fails, the computer system 100 can further perform an irreversible hard tamper operation that renders the HSM 200 unusable (i.e., destroyed). In at least one example, the HSM 200 can be rendered unusable by erasing the targeted firmware from the flash storage unit 204 in response to detecting the results of the hash operation fail to match the predetermined hash.

Figure 3:
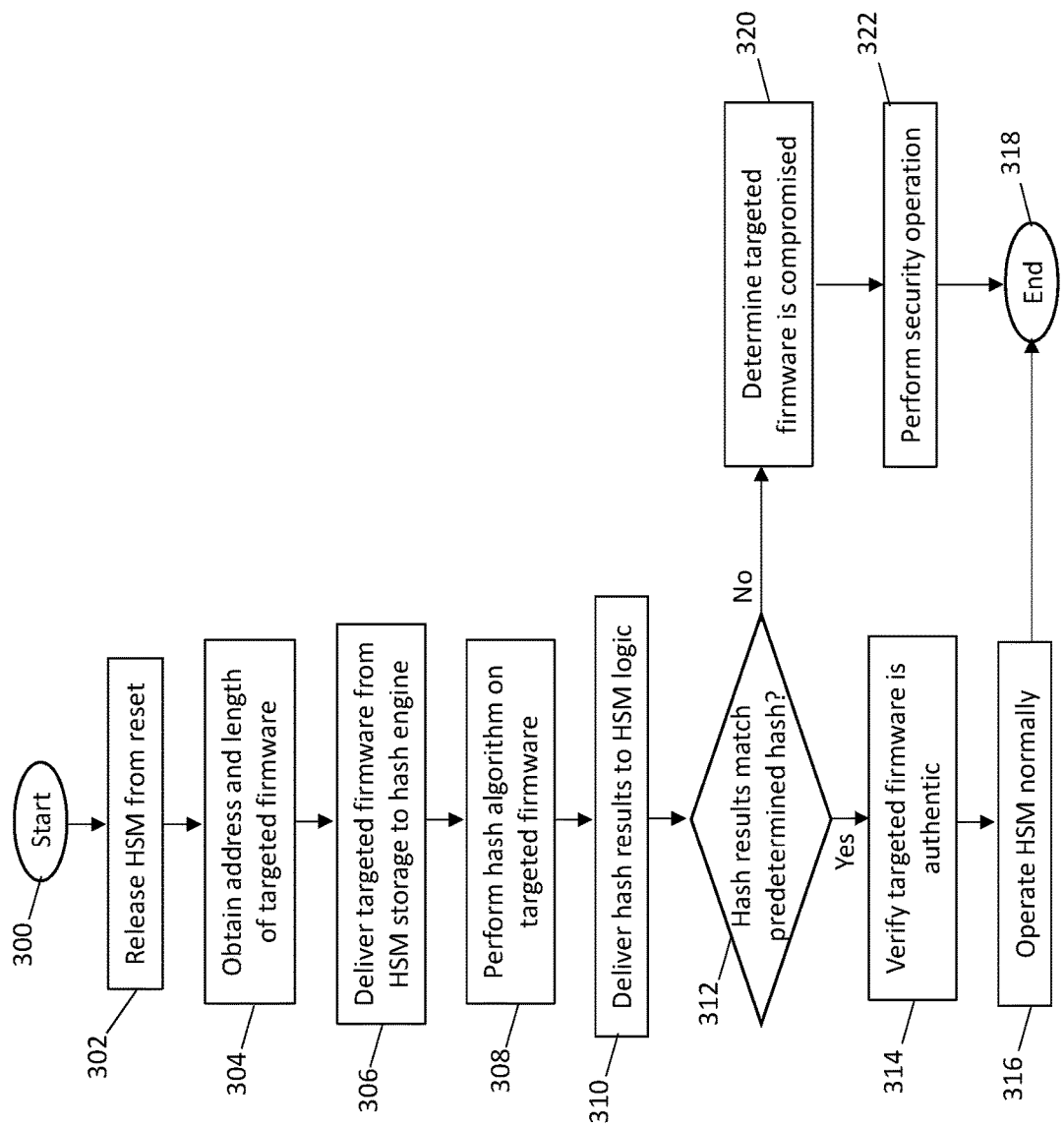
FIG. 3 is a flow diagram illustrating a method of verifying the authenticity of an HSM according to a non-limiting embodiment.

Turning now to FIG. 3, a flow diagram illustrating a method of verifying authenticity of a cryptographic HSM according to a non-limiting embodiment is shown. The method begins at operation 300, and the cryptographic HSM is released from reset at operation 302. For example, a sufficient subset of the HSM hardware is to be released from reset such that the logical operations can be performed (items in the "immutable hardware boundary" (Compact-Flash (CF) bus, logic, hash engine) and can have the ability to access the secure flash). At operation 304, address data and length data of targeted firmware is obtained. At operation 306, the targeted firmware is delivered from a storage unit (e.g., flash storage unit) to a hash engine. Both the storage device and the hash engine are contained in the cryptographic HSM and are secured by a secured boundary such as, for example, a tamper-responsive and tamper-evident housing. At operation 308, the hash engine applies a hash algorithm to the targeted firmware. At operation 310, the hash results generated in response to executing the hash algorithm are delivered to logic circuitry contained in the cryptographic HSM.

At operation 312, the hash results are compared to a predetermined (i.e., known) hash corresponding to authorized firmware expected to be stored in the storage unit. When the hash result matches the known hash, the logic circuitry verifies that the targeted firmware is authentic (e.g., has not been modified) at operation 314, and the cryptographic HSM is operated as normal at operation 316. Accordingly, boot is enabled to proceed to start the internal processor(s) of the HSM and the method ends at operation 318.

When, however, the hash result fails to match the known hash at operation 312, the logic circuitry determines that the targeted firmware is unauthorized (e.g., has been modified or otherwise compromised) at operation 320. At operation 322, one or more security operations are performed. The security operations may include, for example, an attempt to reload a valid version of firmware. The HSM can then be reset and execution can be restarted (e.g., at operation 300) with another attempt to verify installation. When, however, the attempt to verify the firmware is unsuccessful, the system determines that the HSM is unusable and the HSM can be irreversibly destroyed. For example, the targeted firmware is erased from the storage device of the HSM. Once the security operations are preformed, the method ends at operation 318.

As described herein, various non-limiting embodiments of the present teachings provide a computing system that implements a cryptographic hardware security module (HSM) capable of detecting post quantum cryptographic (PQC) security threats such as, for example, Trojan attacks. In at least one non-limiting embodiment, the cryptographic HSM includes an immutable hardware unit, which permits hashing of the flash storage device while also being configured to load data only from specified areas of the flash storage device. Accordingly, the cryptographic HSM can be probed to diagnose the binary executable that is installed within the immutable hardware unit contained within a secure boundary, without the chance that a compromised binary executable falsely reports an output that appears to be a valid hash.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cryptographic hardware security module (HSM) comprising:
    a memory storage device configured to store firmware; and
    an immutable hardware unit in signal communication with the memory storage device, the immutable hardware unit configured to perform a hash operation on targeted firmware stored in the memory storage device to determine an authenticity of the targeted firmware based at least in part on results of the hash operation; and
    a secured boundary that contains the memory storage device and the immutable hardware unit,
    wherein the immutable hardware unit comprises:

a hash engine in signal communication with the memory storage device, the hash engine configured to receive the targeted firmware and to perform the hash operation on the targeted firmware to generate hash results, and wherein the hash results are configured to be delivered to an external processor located externally from the HSM such that the external processor determines the authenticity of the targeted firmware in response to comparing the hash results to a predetermined hash corresponding to an authenticated firmware.

2. The cryptographic HSM of claim 1, wherein the hash operation is performed without physically accessing the secured boundary.

3. The cryptographic HSM of claim 1, wherein the hash engine receives the targeted firmware in response to booting the cryptographic HSM, and performs the hashing operation to generate the hash results in response to receiving the targeted firmware.

4. The cryptographic HSM of claim 1, wherein logic circuitry within the immutable hardware unit disables the targeted firmware from the memory storage device in response to detecting the results of the hash operation fail to match the predetermined hash.

5. A method of authenticating firmware stored in a cryptographic hardware security module (HSM), the method comprising:

securing a memory storage device and an immutable hardware unit within a secured boundary that prevents external access to the memory storage device and the immutable hardware unit;

initiating an authentication process;

delivering targeted firmware from the storage memory device to the immutable hardware unit;

performing, by the immutable hardware unit, a hash operation on the targeted firmware; and determining an authenticity of the targeted firmware based at least in part on results of the hash operation, wherein determining the authenticity of the targeted firmware further comprises:

delivering the targeted firmware to a hash engine within the immutable hardware unit;

performing, by the hash engine, the hash operation on the targeted firmware to generate hash results, delivering the hash results to an external processor located externally from the HSM;

comparing, by the external processor, the hash results to a predetermined hash corresponding to an authenticated firmware; and determining, by the external processor, the authenticity of the targeted firmware based on the comparison between the hash results and the predetermined hash.

6. The method of claim 5, further comprising performing the hash operation without physically accessing the secured boundary.

7. The method of claim 5, wherein determining the authenticity of the targeted firmware further comprises:

delivering the targeted firmware to the hash engine in response to booting the cryptographic HSM; and performing the hashing operation to generate the hash results in response to receiving the targeted firmware.

8. The method of claim 5, further comprising erasing the targeted firmware from the memory storage device in response to detecting the results of the hash operation fail to match the predetermined hash.

9. A computer program product to control a cryptographic hardware security module (HSM) to authenticate firmware, the computer program product comprising a computer readable storage medium having program instructions embodied therewith, the program instructions executable by an electronic computer processor to control the cryptographic HSM to perform operations comprising:

initiating an authentication process;

delivering targeted firmware from a storage memory device to an immutable hardware unit, wherein the memory storage device and the immutable hardware unit are each secured within a secured boundary that prevents external access to the memory storage device and the immutable hardware unit;

performing, by the immutable hardware unit, a hash operation on the targeted firmware; and determining an authenticity of the targeted firmware based at least in part on results of the hash operation, wherein determining the authenticity of the targeted firmware further comprises:

delivering the targeted firmware to a hash engine within the immutable hardware unit;

performing, the hash engine, the hash operation on the targeted firmware to generate hash results, delivering the hash results to an external processor located externally from the HSM;

comparing, by the external processor, the hash results to a predetermined hash corresponding to an authenticated firmware; and determining, by the external processor, the authenticity of the targeted firmware based on the comparison between the hash results and the predetermined hash.

10. The computer program product of claim 9, further comprising performing the hash operation without physically accessing the secured boundary.

11. The computer program product of claim 9, wherein determining the authenticity of the targeted firmware further comprises:

delivering the targeted firmware to the hash engine in response to booting the cryptographic HSM; and performing the hashing operation to generate the hash results in response to receiving the targeted firmware.

12. The computer program product of claim 9, further comprising erasing the targeted firmware from the memory storage device in response to detecting the results of the hash operation fail to match the predetermined hash.

* * * * *